(12) United States Patent
Ranade (10) Patent No.: US 8,478,718 B1
(45) Date of Patent: Jul. 2, 2013

(54) SYSTEMS AND METHODS FOR REPLICATING DATA IN CLUSTER ENVIRONMENTS

(75) Inventor: Dilip Ranade, Maharashtra (IN)

(73) Assignee: Symantec Corporation, Mountain View, CA (US)

( * ) Notice: Subject to any disclaimer, the term of this patent is extended or adjusted under 35 U.S.C. 154(b) by 262 days.

(21) Appl. No.: 12/947,017

(22) Filed: Nov. 16, 2010

(51) Int. Cl.
*G06F 17/30* (2006.01)

(52) U.S. Cl.
USPC ............ 707/610; 707/616; 707/619; 707/625

(58) Field of Classification Search .................. 707/610, 707/616, 619, 625
See application file for complete search history.

(56) References Cited

U.S. PATENT DOCUMENTS

| | | |
|---|---|---|
| 7,254,685 B1 | 8/2007 | Cardente |
| 7,475,207 B2 | 1/2009 | Bromling et al. |
| 7,565,498 B1 | 7/2009 | Baird et al. |
| 7,885,923 B1 * | 2/2011 | Tawri et al. ................... 707/610 |
| 2007/0022264 A1 | 1/2007 | Bromling et al. |
| 2008/0059738 A1 | 3/2008 | Burr et al. |
| 2008/0243950 A1 | 10/2008 | Webman et al. |
| 2008/0243951 A1 | 10/2008 | Webman et al. |
| 2008/0243952 A1 | 10/2008 | Webman et al. |
| 2010/0199042 A1 * | 8/2010 | Bates et al. ................... 711/114 |

OTHER PUBLICATIONS

WIKIPEDIA; "Precision Time Protocol"; http://en.wikipedia.org/wiki/Precision_Time_Protocol; Taken from site on Dec. 14, 2010.

* cited by examiner

*Primary Examiner* — Cindy Nguyen
(74) *Attorney, Agent, or Firm* — ALG Intellectual Property, LLC (57) ABSTRACT

A method for replicating data in cluster environments may include (1) identifying a cluster of nodes configured to replicate common storage of the cluster, (2) identifying a first write operation issued by a first node to the common storage, (3) identifying a second write operation issued by a second node to the common storage after the first write operation, (4) identifying a completion time of the first write operation, (5) identifying a start time of the second write operation, (6) identifying a maximum potential skew between the first system clock and the second system clock, (7) determining that the first and second write operations are mutually independent by determining that the start time of the second write operation precedes the completion time of the first write operation by a span greater than the maximum potential skew, and then (8) replicating the first and second write operations in parallel.

20 Claims, 7 Drawing Sheets

SYSTEMS AND METHODS FOR REPLICATING DATA IN CLUSTER ENVIRONMENTS

BACKGROUND

Many organizations rely upon data replication to improve the reliability, fault-tolerance, and/or accessibility of their applications and/or data. Data replication typically involves replicating data from a primary site or device (such as an application server) to a secondary (i.e., backup) site or device.

Sometimes an organization may run an application on a cluster of nodes. In order to replicate the data of a clustered application, each node of the cluster may replicate write operations issued from that node. However, allowing each node to replicate its write operations in an arbitrary order (e.g., without regard to replicated write operations issued from other nodes) may result in an invalid replica. On the other hand, enforcing a strict serialization on the replication of the write operations may slow down the replication process to the point that the state of the replication cannot keep up with the state of the primary application data.

Traditional technologies may attempt to improve the efficiency of replication in a clustered environment by distinguishing between dependent and independent write operations. If two write operations are mutually independent, then they may be applied in any order with the same result. Accordingly, traditional technologies may transfer dependency relationship data between nodes in order to ensure global write order fidelity. Unfortunately, transferring the necessary dependency relationship data may consume a substantial amount of computing resources and may potentially degrade the performance of the primary application. Furthermore, this traditional method may scale poorly with the size of the cluster. Consequently, the present disclosure identifies a need for additional and improved methods for replicating data in cluster environments.

SUMMARY

As will be described in greater detail below, the instant disclosure generally relates to systems and methods for replicating data in cluster environments by identifying independent write operations and replicating the independent write operations in parallel. These systems and methods may identify independent write operations by synchronizing the system clocks of nodes in a cluster and accounting for clock skew that exists despite the synchronization. In one example, a computing device may accomplish such a task by (1) identifying a cluster of nodes configured to replicate a common storage of the cluster, (2) identifying a first write operation issued by a first node in the cluster of nodes to the common storage, (3) identifying a second write operation issued after the first write operation by a second node in the cluster of nodes to the common storage, (4) identifying a completion time of the first write operation as recorded by a first system clock of the first node, (5) identifying a start time of the second write operation as recorded by a second system clock of the second node, (6) identifying a maximum potential skew between the first system clock and the second system clock, (7) determining that the first write operation and the second write operation are mutually independent by determining that the start time of the second write operation precedes the completion time of the first write operation by a span greater than the maximum potential skew, and then (8) replicating the first write operation and the second write operation in parallel based on the determination that the first write operation and the second write operation are mutually independent.

The cluster of nodes may be configured to provide any of a variety of replication services. In some examples, the cluster of nodes may be configured to provide continuous data protection for the common storage.

The systems described herein may identify the maximum potential skew between the first and second system clocks in any suitable manner. For example, identifying the maximum potential skew may include (1) transmitting a first message from the first node to the second node that includes a first timestamp based on the time as identified by the first system clock that the first node transmitted the first message, (2) generating a second timestamp based on the time as identified by the second system clock that the second node received the first message, (3) transmitting a second message from the second node to the first node that includes a third timestamp based on the time as identified by the second system clock that the second node transmitted the second message, (4) generating a fourth timestamp based on the time as identified by the first system clock that the first node received the second message, and then (5) calculating the maximum potential skew based on the first, second, third, and fourth timestamps. In some examples, the systems described herein may also synchronize the first system clock and the second system clock (e.g., before identifying the maximum potential skew and/or as a part of identifying the maximum potential skew).

In some examples, the systems described herein may determine that the maximum potential skew exceeds a predetermined threshold. In these examples, these systems may respond in any of a variety of ways. For example, upon determining that the maximum potential skew exceeds the predetermined threshold, these systems may switch to an alternate dependency protocol until the first system clock and the second system clock are resynchronized. In another example, upon determining that the maximum potential skew exceeds the predetermined threshold, these systems may suspend write operations from the first node and the second node until the first system clock and the second system clock are resynchronized. To determine that the maximum potential skew exceeds the predetermined threshold, these systems may, in some examples, extrapolate the maximum potential skew based on an estimated rate of change of a skew between the first and second system clocks.

In addition to identifying independent write operations, the systems and methods described herein may also identify dependent write operations. In one example, these systems may accomplish such a task by (1) identifying a third write operation issued by a third node in the cluster of nodes to the common storage, (2) identifying a fourth write operation issued after the third write operation by a fourth node in the cluster of nodes to the common storage, (3) identifying a completion time of the third write operation as recorded by a third system clock of the third node, (4) identifying a start time of the fourth write operation as recorded by a fourth system clock of the fourth node, (5) identifying an additional maximum potential skew between the third system clock and the fourth system clock, and then (6) determining that the fourth write operation is dependent on the third write operation based in part by determining that the start time of the fourth write operation does not precede the completion time of the third write operation by a span greater than the additional maximum potential skew. These systems may then replicate the third write operation and the fourth write operation serially based on the determination that the fourth write operation depends on the third write operation.

In some contexts an additional node may join the cluster of nodes (e.g., to scale up computing resources for a primary application running on the cluster). In these contexts, the systems described herein may identify the additional node configured to join the cluster of nodes and then synchronize a system clock of the additional node with the cluster before allowing the additional node to join the cluster.

As will be described in greater detail below, by synchronizing the system clocks of nodes in a cluster and accounting for clock skew that exists despite the synchronization, the systems described herein may be able to identify a substantial number of independent write operations issued by nodes in the cluster without overburdening the cluster with expensive transfers of dependency information. By then applying these independent write operations to the replication process in parallel, the systems described herein may efficiently perform the replication (e.g., preventing the replication process from falling far behind the primary data being replicated).

Features from any of the above-mentioned embodiments may be used in combination with one another in accordance with the general principles described herein. These and other embodiments, features, and advantages will be more fully understood upon reading the following detailed description in conjunction with the accompanying drawings and claims.

BRIEF DESCRIPTION OF THE DRAWINGS

The accompanying drawings illustrate a number of exemplary embodiments and are a part of the specification. Together with the following description, these drawings demonstrate and explain various principles of the instant disclosure.

Throughout the drawings, identical reference characters and descriptions indicate similar, but not necessarily identical, elements. While the exemplary embodiments described herein are susceptible to various modifications and alternative forms, specific embodiments have been shown by way of example in the drawings and will be described in detail herein. However, the exemplary embodiments described herein are not intended to be limited to the particular forms disclosed. Rather, the instant disclosure covers all modifications, equivalents, and alternatives falling within the scope of the appended claims.

DETAILED DESCRIPTION OF EXEMPLARY EMBODIMENTS

Figure 1:
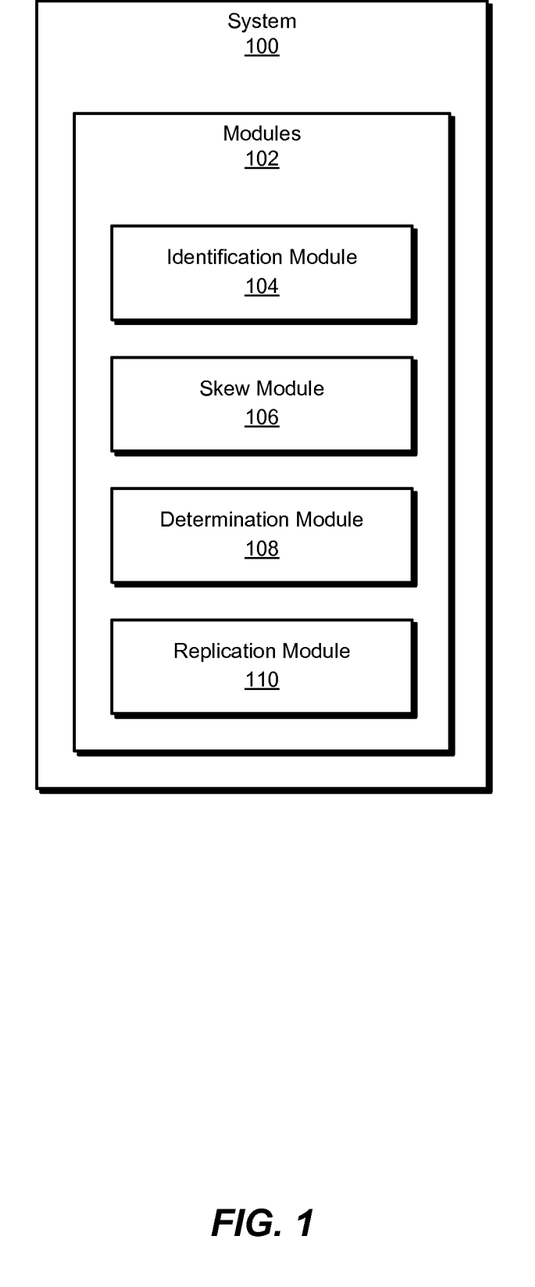
FIG. 1 is a block diagram of an exemplary system for replicating data in cluster environments.
Figure 2:
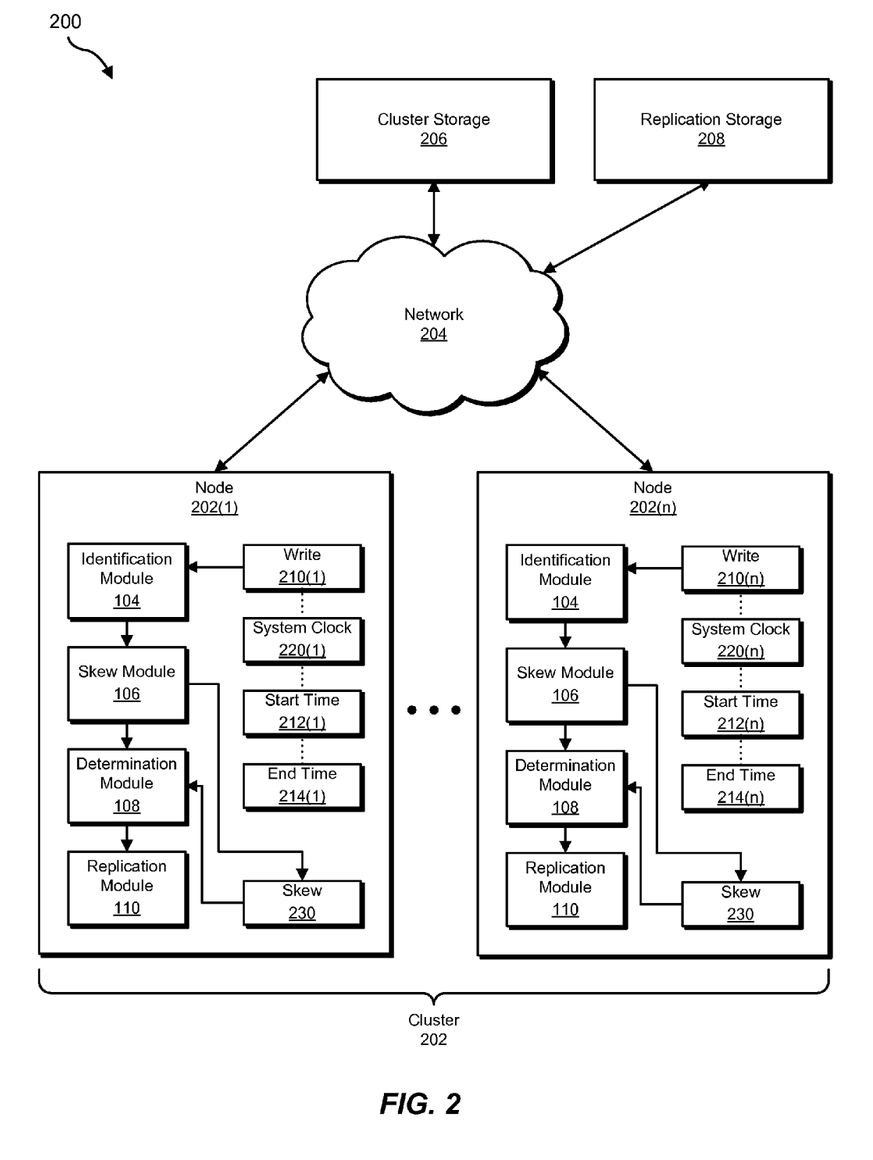
FIG. 2 is a block diagram of an exemplary system for replicating data in cluster environments.

The following will provide, with reference to FIGS. 1-2, detailed descriptions of exemplary systems for replicating data in cluster environments. Detailed descriptions of corresponding computer-implemented methods will also be provided in connection with FIGS. 3-5. In addition, detailed descriptions of an exemplary computing system and network architecture capable of implementing one or more of the embodiments described herein will be provided in connection with FIGS. 6 and 7, respectively.

FIG. 1 is a block diagram of an exemplary system 100 for replicating data in cluster environments. As illustrated in this figure, exemplary system 100 may include one or more modules 102 for performing one or more tasks. For example, and as will be explained in greater detail below, exemplary system 100 may include an identification module 104 programmed to (1) identify a cluster of nodes configured to replicate a common storage of the cluster, (2) identify a first write operation issued by a first node in the cluster of nodes to the common storage, (3) identify a second write operation issued after the first write operation by a second node in the cluster of nodes to the common storage, (4) identify a completion time of the first write operation as recorded by a first system clock of the first node, and (5) identify a start time of the second write operation as recorded by a second system clock of the second node. Exemplary system 100 may also include a skew module 106 programmed to identify a maximum potential skew between the first system clock and the second system clock.

In addition, and as will be described in greater detail below, exemplary system 100 may include a determination module 108 programmed to determine that the first write operation and the second write operation are mutually independent by determining that the start time of the second write operation precedes the completion time of the first write operation by a span greater than the maximum potential skew. Exemplary system 100 may also include a replication module 110 programmed to replicate the first write operation and the second write operation in parallel based on the determination that the first write operation and the second write operation are mutually independent. Although illustrated as separate elements, one or more of modules 102 in FIG. 1 may represent portions of a single module or application.

In certain embodiments, one or more of modules 102 in FIG. 1 may represent one or more software applications or programs that, when executed by a computing device, may cause the computing device to perform one or more tasks. For example, as will be described in greater detail below, one or more of modules 102 may represent software modules stored and configured to run on one or more computing devices, such as the devices illustrated in FIG. 2 (e.g., nodes 202(1)-(n) of cluster 202, cluster storage 206, and/or replication storage 208), computing system 610 in FIG. 6, and/or portions of exemplary network architecture 700 in FIG. 7. One or more of modules 102 in FIG. 1 may also represent all or portions of one or more special-purpose computers configured to perform one or more tasks.

Exemplary system 100 in FIG. 1 may be deployed in a variety of ways. For example, all or a portion of exemplary system 100 may represent portions of exemplary system 200 illustrated in FIG. 2. As shown in FIG. 2, system 200 may include a cluster of nodes 202 in communication with a cluster storage 206 and a replication storage 208 via a network 204.

In one embodiment, and as will be described in greater detail below, modules 102 from FIG. 1 may program cluster 202 to replicate data stored in cluster storage 206 to replication storage 208 by (1) identifying a cluster of nodes (e.g., cluster 202) configured to replicate (e.g., to replication storage 208) a common storage of the cluster (e.g., cluster storage 206), (2) identifying a first write operation (e.g., a write 210(1)) issued by a first node in the cluster of nodes (e.g., node 202(1)) to the common storage, (3) identifying a second write operation (e.g., write 210(n)) issued by a second node in the cluster of nodes (e.g., node 202(n)) to the common storage, the second write operation issued after the first write operation, (4) identifying a completion time of the first write operation (e.g., an end time 214(1)) as recorded by a first system clock of the first node (e.g., a system clock 220(1)), (5) identifying a start time of the second write operation (e.g., a start time 212(n)) as recorded by a second system clock of the second node (e.g., a system clock 220(n)), (6) identifying a maximum potential skew between the first system clock and the second system clock (e.g., a skew 230), (7) determining that the first write operation and the second write operation are mutually independent by determining that the start time of the second write operation precedes the completion time of the first write operation by a span greater than the maximum potential skew, and then (8) replicating the first write operation and the second write operation in parallel based on the determination that the first write operation and the second write operation are mutually independent.

Nodes 202(1)-(n) generally represent any type or form of computing device capable of reading computer-executable instructions. Examples of nodes 202(1)-(n) include, without limitation, servers, desktops, laptops, cellular phones, personal digital assistants (PDAs), multimedia players, embedded systems, combinations of one or more of the same, exemplary computing system 610 in FIG. 6, or any other suitable computing device. In one example, cluster 202 may represent a cluster of computing devices configured to run a clustered application as an application server.

Cluster storage 206 may represent portions of a single volume or storage device or a plurality of volumes or storage devices. For example, cluster storage 206 may represent storage provided to and/or used by cluster 202. In some examples, portions of cluster storage 206 may represent a portion of computing system 610 in FIG. 6, and/or portions of exemplary network architecture 700 in FIG. 7. Alternatively, cluster storage 206 in FIG. 2 may represent one or more physically separate devices capable of being accessed by a computing device, such as nodes 202(1)-(n) in FIG. 2, computing system 610 in FIG. 6, and/or portions of exemplary network architecture 700 in FIG. 7.

Replication storage 208 may represent portions of a single volume or storage device or a plurality of volumes or storage devices. For example, replication storage 208 may represent storage provided for replicating cluster storage 206 and/or for providing replication and/or continuous data protection storage for cluster 202. In some examples, portions of replication storage 208 may represent a portion of computing system 610 in FIG. 6, and/or portions of exemplary network architecture 700 in FIG. 7. Alternatively, cluster storage 206 in FIG. 2 may represent one or more physically separate devices capable of being accessed by a computing device, such as nodes 202(1)-(n) in FIG. 2, computing system 610 in FIG. 6, and/or portions of exemplary network architecture 700 in FIG. 7.

Network 204 generally represents any medium or architecture capable of facilitating communication or data transfer. Examples of network 204 include, without limitation, an intranet, a wide area network (WAN), a local area network (LAN), a storage area network (SAN), a personal area network (PAN), the Internet, power line communications (PLC), a cellular network (e.g., a GSM Network), exemplary network architecture 700 in FIG. 7, or the like. Network 204 may facilitate communication or data transfer using wireless or wired connections. In one embodiment, network 204 may facilitate communication between cluster 202, cluster storage 206, and replication storage 208.

Figure 3:
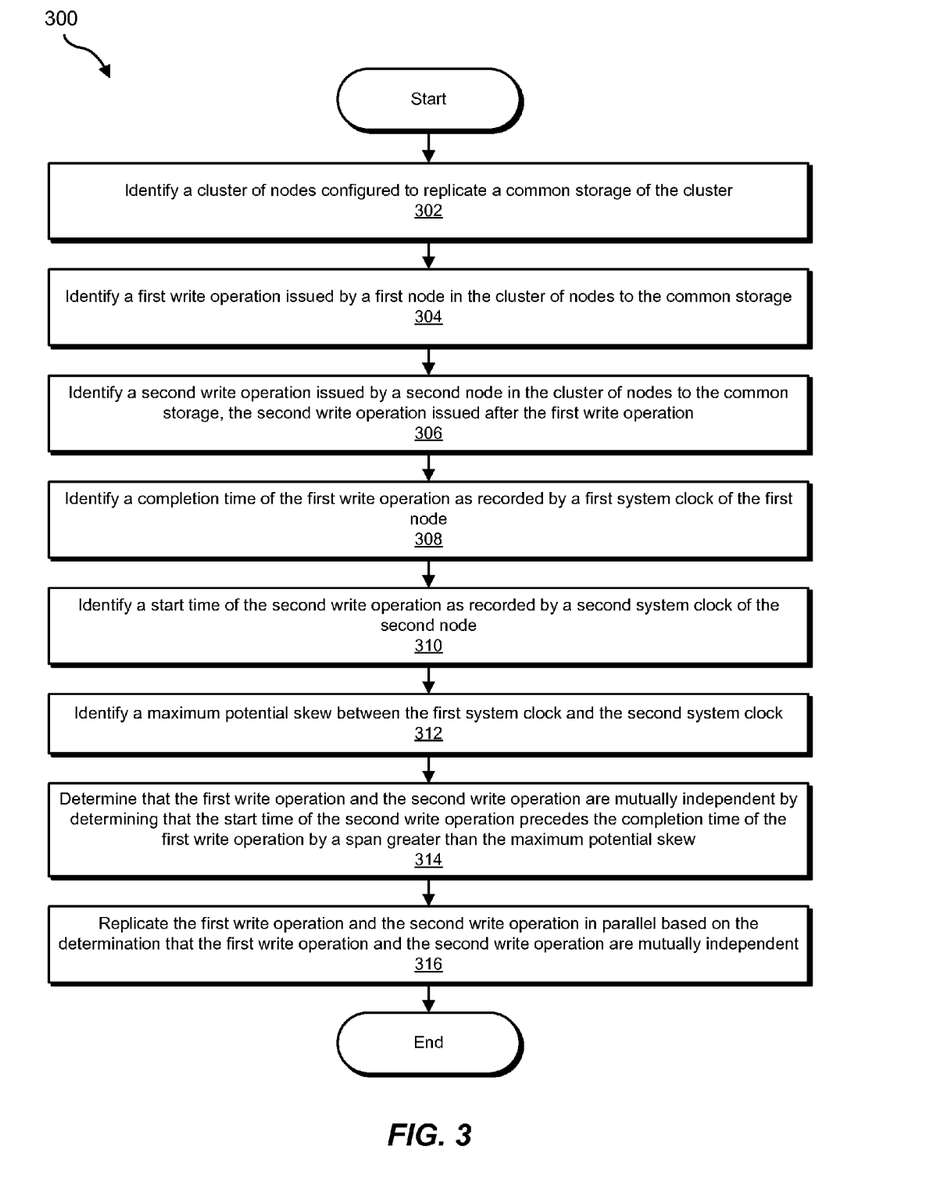
FIG. 3 is a flow diagram of an exemplary method for replicating data in cluster environments.

FIG. 3 is a flow diagram of an exemplary computer-implemented method 300 for replicating data in cluster environments. The steps shown in FIG. 3 may be performed by any suitable computer-executable code and/or computing system. In some embodiments, the steps shown in FIG. 3 may be performed by one or more of the components of system 100 in FIG. 1 and/or system 200 in FIG. 2.

As illustrated in FIG. 3, at step 302 one or more of the systems described herein may identify a cluster of nodes configured to replicate a common storage of the cluster. For example, at step 302 identification module 104 may, as part of node 202(1) of cluster 202 in FIG. 2, identify cluster 202 configured to replicate cluster storage 206 (to, e.g., replication storage 208).

Identification module 104 may perform step 302 in any suitable manner. For example, identification module 104 may identify the cluster of nodes by reading a configuration file that identifies the cluster of nodes. Additionally or alternatively, identification module 104 may identify the cluster of nodes simply by executing on one or more nodes of the cluster of nodes.

In some examples, identification module 104 may identify that the cluster of nodes is configured to replicate the common storage of the cluster by applying write operations performed by nodes in the cluster (e.g., directed to the common storage) to a replication storage. For example, the cluster may provide a host-based replication service (rather than, e.g., an appliance replicating data from the common storage directly). In this example, each node of the cluster may include a replication agent. The cluster of nodes may be configured to replicate one or more volumes of data used by one or more applications running on the cluster.

As used herein, the term "replication" may refer to any scheme for maintaining an up-to-date copy of a collection of data. In some examples, the cluster of nodes may be configured to replicate the common storage by providing continuous data protection for the common storage. As used herein, the term "continuous data protection" may refer to any service for providing continuous and/or real-time backup services. In some examples, "continuous data protection" may refer to a service that conserves changes made to a collection of data, such that the collection of data may be restored to its state at previous points in time.

At step 304, one or more of the systems described herein may identify a first write operation issued by a first node in the cluster of nodes to the common storage. For example, at step 304 identification module 104 may, as part of node 202(1) of cluster 202 in FIG. 2, identify write 210(1) issued by node 202(1) to cluster storage 206.

Identification module 104 may perform step 304 in any suitable manner. For example, identification module 104 may identify the first write operation by intercepting the first write operation (e.g., as part of a file system driver). Additionally or alternatively, identification module 104 may identify the first write operation by receiving a message from a replication agent. In some examples, identification module 104 may identify the first write operation as a part of identifying write operations issued from the first node to replicate.

Figure 4:
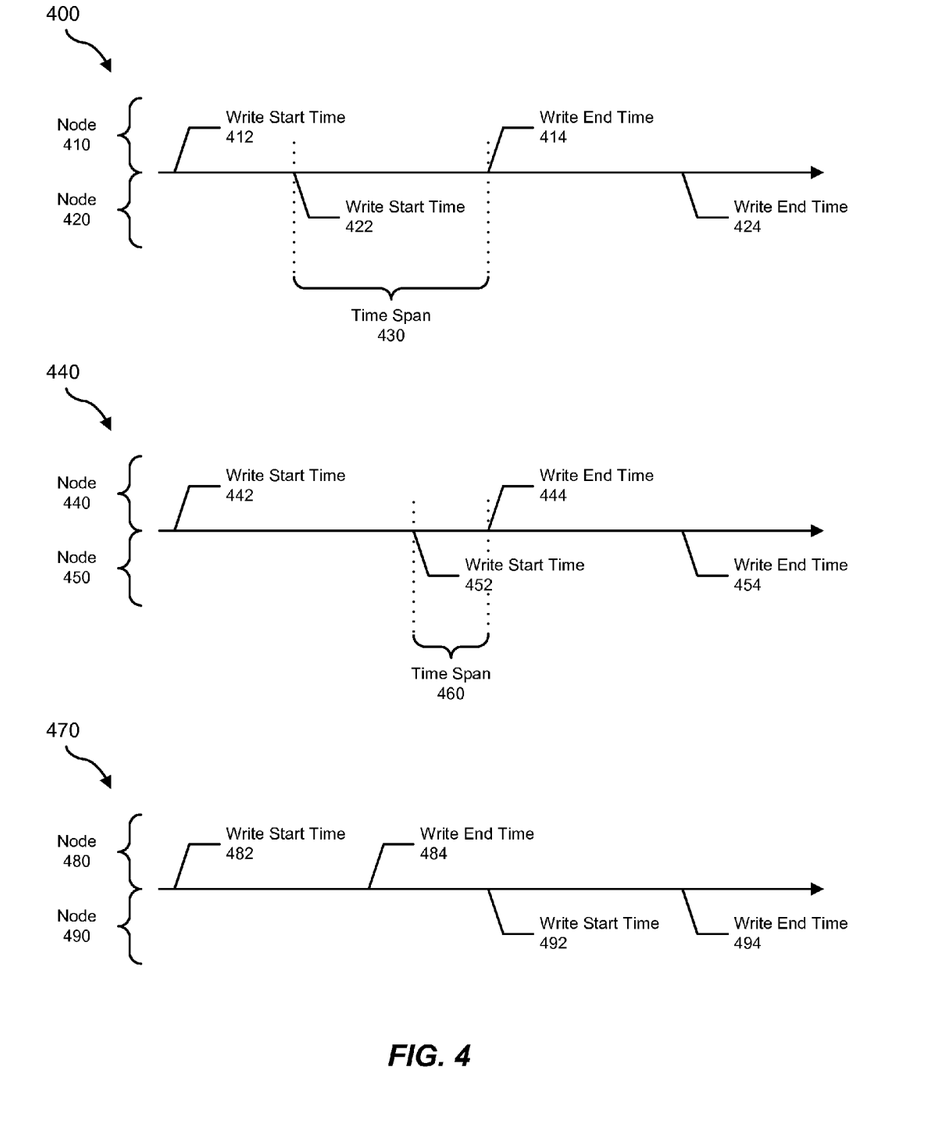
FIG. 4 is a diagram of exemplary timelines for replicating data in cluster environments.

FIG. 4 illustrates three timelines of write operations performed by various nodes of a cluster: timeline 400, timeline 440, and timeline 470. Timeline 400, for example, shows a write operation issued by a node 410 at a write start time 412 and completed at a write end time 414. Timeline 400 also shows a write operation issued by a node 420 at a write start time 422 and completed at a write end time 424. Using FIG. 4 as an example, identification module 104 may identify the write operation issued by node 410 as the first write operation.

Returning to FIG. 3, at step 306 one or more of the systems described herein may identify a second write operation issued by a second node in the cluster of nodes to the common storage, the second write operation having been issued after the first write operation. For example, at step 306 identification module 104 may, as part of node 202(1) of cluster 202 in FIG. 2, identify write 210(n) issued by node 202(n) to cluster storage 206. Using FIG. 4 as an example, identification module 104 may identify a write operation issued by node 420 at write start time 422 (issued after the first write operation, e.g., the write operation issued by node 410 at write start time 412).

Identification module 104 may perform step 306 in any suitable manner. For example, identification module 106 may identify the second write operation by intercepting the second write operation (e.g., as part of a file system driver on the second node). Additionally or alternatively, identification module 104 may identify the second write operation by receiving a message from a replication agent on the second node. In some examples, identification module 104 may identify the second write operation as a part of identifying write operations issued from the second node to replicate.

Returning to FIG. 3, at step 308 one or more of the systems described herein may identify a completion time of the first write operation as recorded by a first system clock of the first node. For example, at step 308 identification module 104 may, as part of node 202(1) of cluster 202 in FIG. 2, identify end time 214(1) of write 210(1) as recorded by system clock 220(1). Using FIG. 4 as an example, identification module 104 may identify write end time 414 of a write operation issued by node 410.

As used herein, the term "completion time" as regarding a write operation may represent any time after which the write operation may be considered a completed transaction and after which any subsequent write operations may depend on the write operation. Additionally, as used herein, the term "system clock" may refer to any timing mechanism by which a computing device may determine, measure, and/or mark the absolute and/or relative timing of events.

Identification module 104 may perform step 308 in any suitable manner. For example, identification module 104 may identify the completion time of the first write operation as part of a file system driver. Additionally or alternatively, identification module 104 may identify the completion time of the first write operation by reading an input/output transaction log identifying the completion time of the first write operation.

At step 310, one or more of the systems described herein may identify a start time of the second write operation as recorded by a second system clock of the second node. For example, at step 310 identification module 104 may, as part of node 202(1) of cluster 202 in FIG. 2, identify start time 212(n) of write 210(n) as recorded by system clock 220(n). Using FIG. 4 as an example, identification module 104 may identify write start time 422 of a write operation issued by node 420.

Identification module 104 may perform step 310 in any suitable manner. For example, identification module 104 may identify the start time of the second write operation as part of a file system driver. Additionally or alternatively, identification module 104 may identify the start time of the second write operation by reading an input/output transaction log identifying the start time of the second write operation. In some examples, identification module 104 may receive a message identifying the start time of the second write operation from the second node.

At step 312, one or more of the systems described herein may identify a maximum potential skew between the first system clock and the second system clock. For example, at step 312 skew module 106 may, as part of node 202(1) of cluster 202 in FIG. 2, identify skew 230 between system clocks 220(1) and 220(n).

As used herein, the term "skew" may refer to a difference between two system clocks. Accordingly, the term "maximum potential skew" may refer to the maximum potential difference between two system clocks at a given time. In some examples, the "maximum potential skew" may refer an absolute maximum potential skew. In other examples, the "maximum potential skew" may refer to the maximum potential skew with a predetermined degree of certainty (e.g., a 99.5% certainty that the skew between two system clocks does not exceed the maximum potential skew).

Skew module 106 may perform step 312 in any suitable manner. In some examples, skew module 106 may transmit time-stamped messages between two or more nodes in the cluster in order to estimate the skew. For example, skew module 106 may (1) transmit a first message from the first node to the second node, the first message including a first timestamp based on the time as identified by the first system clock that the first node transmitted the first message, (2) generate a second timestamp based on the time as identified by the second system clock that the second node received the first message, (3) transmit a second message from the second node to the first node, the second message including a third timestamp based on the time as identified by the second system clock that the second node transmitted the second message, (4) generate a fourth timestamp based on the time as identified by the first system clock that the first node received the second message, and then (5) calculate the maximum potential skew based on the first, second, third, and fourth timestamps.

For example, skew module 106 may calculate an estimated one-way latency between the first and second nodes based on an average of the differences between the second and first timestamps and the fourth and third timestamps. Skew module 106 may then subtract the estimated latency from either of the apparent observed latencies (e.g., the difference between the second and first timestamps or the fourth and third timestamps) to estimate the skew.

In some examples, skew module 106 may also synchronize the first system clock and the second system clock. For example, skew module 106 may synchronize the first and second system clocks before identifying the maximum potential skew. Additionally or alternatively, skew module 106 may identify the maximum potential skew as a part of synchronizing the first and second system clocks. For example, skew module 106 may use a network time protocol and/or other clock synchronization protocol for synchronizing the first and second system clocks (along with, e.g., system clocks of any other nodes in the cluster). Although the network time protocol may be unable to perfectly synchronize the system clocks, the network time protocol may provide a minimum and/or maximum bound for the skew between system clocks. Accordingly, skew module 106 may identify the maximum potential skew by implementing and/or receiving a message from the network time protocol. In some examples, skew module 106 may synchronize the first and second system clocks using a clock synchronization protocol that directly synchronizes the first and second system clocks. Additionally or alternatively, skew module 106 may synchronize all system clocks in the cluster using the clock synchronization protocol (e.g., via a hierarchy), including the first and second system clocks.

Skew module 106 may also account for drift between the first and second system clocks when determining that maximum potential skew between the first and second system clocks. As used herein, the term "drift" may refer to a frequency difference between two system clocks and/or a rate of change in the skew between two system clocks (e.g., due to environmental differences between the system clocks such as operating temperature, load variations, etc.). In some examples, skew module 106 may synchronize the first and second system clocks by synchronizing the frequency of the system clocks as well as the times of the system clocks.

In some examples, skew module 106 may determine that the maximum potential skew exceeds a predetermined threshold. In these examples, the predetermined threshold may represent a maximum tolerable skew. For example, the skew between two system clocks may normally be much smaller than storage I/O service times (e.g., 0.1 milliseconds compared to 2-10 milliseconds). If the skew between two system clocks approaches storage I/O service times too closely, it may become impractical to use reported I/O start and completion times to make dependency determinations. In some examples, skew module 106 may determine that the maximum potential skew exceeds the predetermined threshold simply by comparing the two figures. Additionally or alternatively, skew module 106 may account for the drift between the first and second system clocks as well. For example, skew module 106 may extrapolate the maximum potential skew based on an estimated rate of change of a skew between the first system clock and the second system clocks. In this example, if the drift is de/dt, the time required to remediate the maximum potential skew exceeding the predetermined threshold is T, the maximum tolerable skew is E, and the current maximum potential skew is e, the predetermined threshold may be at e>E−T (de/dt).

Once skew module 106 has determined that the maximum potential skew exceeds the predetermine threshold, skew module 106 may remediate using any of a variety of approaches. For example, skew module 106 may switch to an alternate dependency protocol until the first system clock and the second system clock are resynchronized. For example, skew module 106 may require that dependency information about write operations is preserved and communicated between nodes. Additionally or alternatively, skew module 106 may suspend any judgments on write dependencies, forcing the serial application of write operations to the replication process. Once the first and second system clocks are resynchronized, skew module 106 may allow dependency determinations based on the maximum potential skew (as will be described in greater detail below) to resume.

In another example, skew module 106 may suspend write operations from the first node and the second node until the first system clock and the second system clock are resynchronized. In some examples, skew module 106 may suspend write operations for the entire cluster until the system clocks of the cluster are resynchronized.

Returning to FIG. 3, at step 314 one or more of the systems described herein may determine that the first write operation and the second write operation are mutually independent by determining that the start time of the second write operation precedes the completion time of the first write operation by a span greater than the maximum potential skew. For example, at step 314 determination module 108 may, as part of node 202(1) of cluster 202 in FIG. 2, determine that write 210(1) and write 210(n) are mutually independent by determining that start time 212(n) precedes end time 214(1) by a span greater than skew 230.

As used herein, the term "dependent" with regard to write operations may refer to any relationship between two write operations requiring that the two write operations be applied in a certain order so as to guarantee write-order fidelity (e.g., to guarantee that a replication of primary data matches the primary data). For example, if the second write operation depends on the first write operation, then the first write operation must apply before the second write operation in order to guarantee write order fidelity. Likewise, the term "independent" with regard to write operations may refer to any relationship between two write operations wherein the write operations may be applied in any order without disturbing write-order fidelity.

Using timeline 400 in FIG. 4 as an example, determination module 108 may determine that the write issued by node 410 at write start time 412 and the write issued by node 420 at write start time 422 are mutually independent. Determination module 108 may do so by determining that write start time 422 precedes write end time 414 by a time span 430, and that time span 430 exceeds the maximum potential skew between the system clocks of nodes 410 and 420. Since adjusting write start time 422 by the maximum potential skew still would leave the two write operations overlapping, determination module 108 may infer that the two write operations are mutually independent.

Returning to FIG. 3, at step 316 one or more of the systems described herein may replicate the first write operation and the second write operation in parallel based on the determination that the first write operation and the second write operation are mutually independent. For example, at step 316 replication module 110 may, as part of node 202(1) of cluster 202 in FIG. 2, replicate write 210(1) and write 210(n) to replication storage 208 in parallel based on the determination that writes 210(1) and 210(n) are mutually independent.

Replication module 110 may perform step 316 in any suitable manner. For example, replication module 110 may replicate the first write operation and the second write operation in parallel by applying the first and second write operations to a replication storage at the same time. In some examples, replication module 110 may replicate the first and second operations in parallel simply by applying the first and second write operations to the replication storage without regard to order. After performing step 316, method 300 may terminate.

Figure 5:
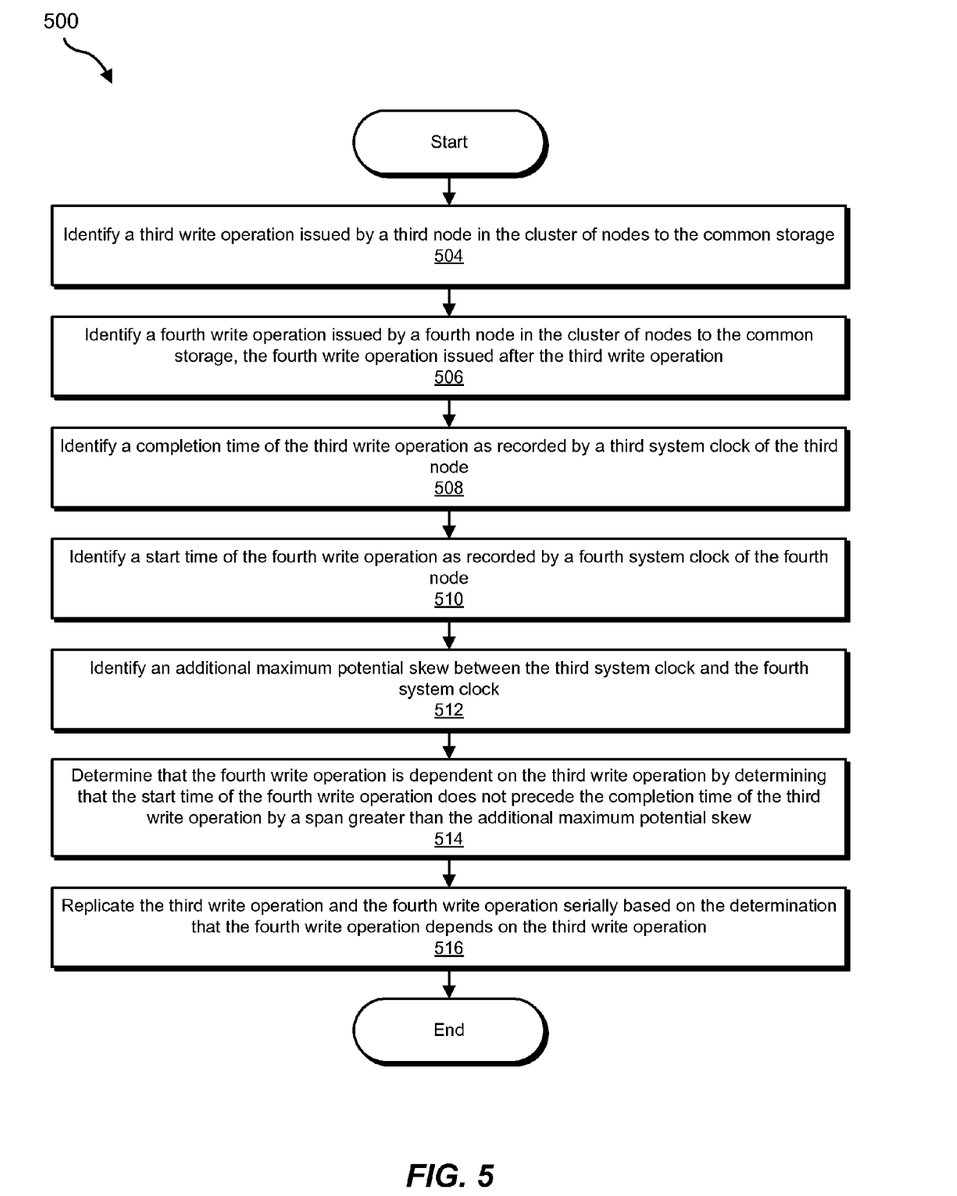
FIG. 5 is a flow diagram of an exemplary method for replicating data in cluster environments.

FIG. 5 is a flow diagram of an exemplary computer-implemented method 500 for replicating data in cluster environments. The steps shown in FIG. 5 may be performed by any suitable computer-executable code and/or computing system. In some embodiments, the steps shown in FIG. 5 may be performed by one or more of the components of system 100 in FIG. 1 and/or system 200 in FIG. 2.

As illustrated in FIG. 5, at step 504 one or more of the systems described herein may identify a third write operation issued by a third node in the cluster of nodes to the common storage. For example, at step 504 identification module 104 may, as part a node 440 in FIG. 4, identify a write operation issued at a write start time 442. Identification module 104 may perform step 504 in any suitable manner. For example, identification module 104 may use any of the exemplary steps, techniques, and/or methods identified in the discussion of step 304 above with respect to identifying the first write operation.

At step 506, one or more of the systems described herein may identify a fourth write operation issued by a fourth node in the cluster of nodes to the common storage, the fourth write operation having been issued after the third write operation. For example, at step 506 identification module 104 may, as part of a node 450 in FIG. 4, identify a write operation issued by node 450 at write start time 452 (issued after the third write operation, e.g., the write operation issued by node 440 at write start time 442). Identification module 104 may perform step

506 in any suitable manner. For example, identification module 104 may use any of the exemplary steps, techniques, and/or methods identified in the discussion of step 306 above with respect to identifying the second write operation.

At step 508, one or more of the systems described herein may identify a completion time of the third write operation as recorded by a third system clock of the third node. For example, at step 508 identification module 104 may, as part of node 440 in FIG. 4, identify write end time 444 of a write operation issued by node 440. Identification module 104 may perform step 508 in any suitable manner. For example, identification module 104 may use any of the exemplary steps, techniques, and/or methods identified in the discussion of step 308 above with respect to identifying the completion time of the first write operation.

At step 510, one or more of the systems described herein may identify a start time of the fourth write operation as recorded by a fourth system clock of the fourth node. For example, at step 510 identification module 104 may, as part of node 450 in FIG. 4, identify write start time 452 of a write operation issued by node 450. For example, identification module 104 may use any of the exemplary steps, techniques, and/or methods identified in the discussion of step 310 above with respect to identifying the start time of the second write operation.

At step 512, one or more of the systems described herein may identify a maximum potential skew between the third system clock and the fourth system clock. For example, skew module 106 may use any of the exemplary steps, techniques, and/or methods identified in the discussion of step 312 above with respect to identifying the maximum potential skew between the first system clock and the second system clock.

At step 514, one or more of the systems described herein may determine that the fourth write operation is dependent on the third write operation by determining that the start time of the fourth write operation does not precede the completion time of the third write operation by a span greater than the additional maximum potential skew.

Using timeline 440 in FIG. 4 as an example, determination module 108 may determine that the write issued by node 450 at write start time 452 depends on the write issued by node 440 at write start time 442. Determination module 108 may do so by determining that write start time 452 precedes write end time 444 by a time span 460, and that time span 460 does not exceed the maximum potential skew between the system clocks of nodes 440 and 440. Since adjusting write start time 452 by the maximum potential skew may mean that the two write operations may not overlap, determination module 108 may infer a dependency relationship between the two write operations.

Using timeline 470 in FIG. 4 as another example, a node 480 may issue a write operation at write start time 482 that completes at a write end time 484, and a node 490 may issue a write operation at write start time 492 that completes at a write end time 494. Since the two write operations do not overlap, the systems described herein may treat the write operation issued by node 490 as dependent on the write operation issued by node 480 (e.g., in the same manner as the write operations of timeline 440).

Returning to FIG. 3, at step 516 one or more of the systems described herein may replicate the third write operation and the fourth write operation serially based on the determination that the fourth write operation depends on the third write operation.

Replication module 110 may perform step 516 in any suitable manner. For example, replication module 110 may replicate the fourth write operation and the third write operation serially by applying the third write operation followed to a replication storage followed by applying the fourth write operation. In some examples, replication module 110 may first build a dependency graph of several write operations including the third and fourth write operations. In these examples, replication module 110 may designate the fourth write operation as dependent on the third write operation within the dependency graph and then apply the write operations within the dependency graph in an order that respects the dependencies. After performing step 516, method 500 may terminate.

In some contexts, an additional node may join the cluster of nodes (e.g., to scale up computing resources for a primary application running on the cluster). In these contexts, the systems described herein may identify the additional node configured to join the cluster of nodes and then synchronize a system clock of the additional node with the cluster before allowing the additional node to join the cluster. The systems described herein may accomplish these steps in any suitable manner. For example, the systems described herein may alter a protocol for adding nodes to require synchronizing the system clock of an additional node before adding the additional node. Additionally or alternatively, the systems described herein may intercept and block any attempt to add an additional node to the cluster and then synchronize the system clock of the additional node with the cluster before allowing the attempt to proceed.

As detailed above, by synchronizing the system clocks of nodes in a cluster and accounting for clock skew that exists despite the synchronization, the systems described herein may be able to identify a substantial number of independent write operations issued by nodes in the cluster without overburdening the cluster with expensive transfers of dependency information. By then applying these independent write operations to the replication process in parallel, the systems described herein may efficiently perform the replication (e.g., preventing the replication process from falling far behind the primary data being replicated).

Figure 6:
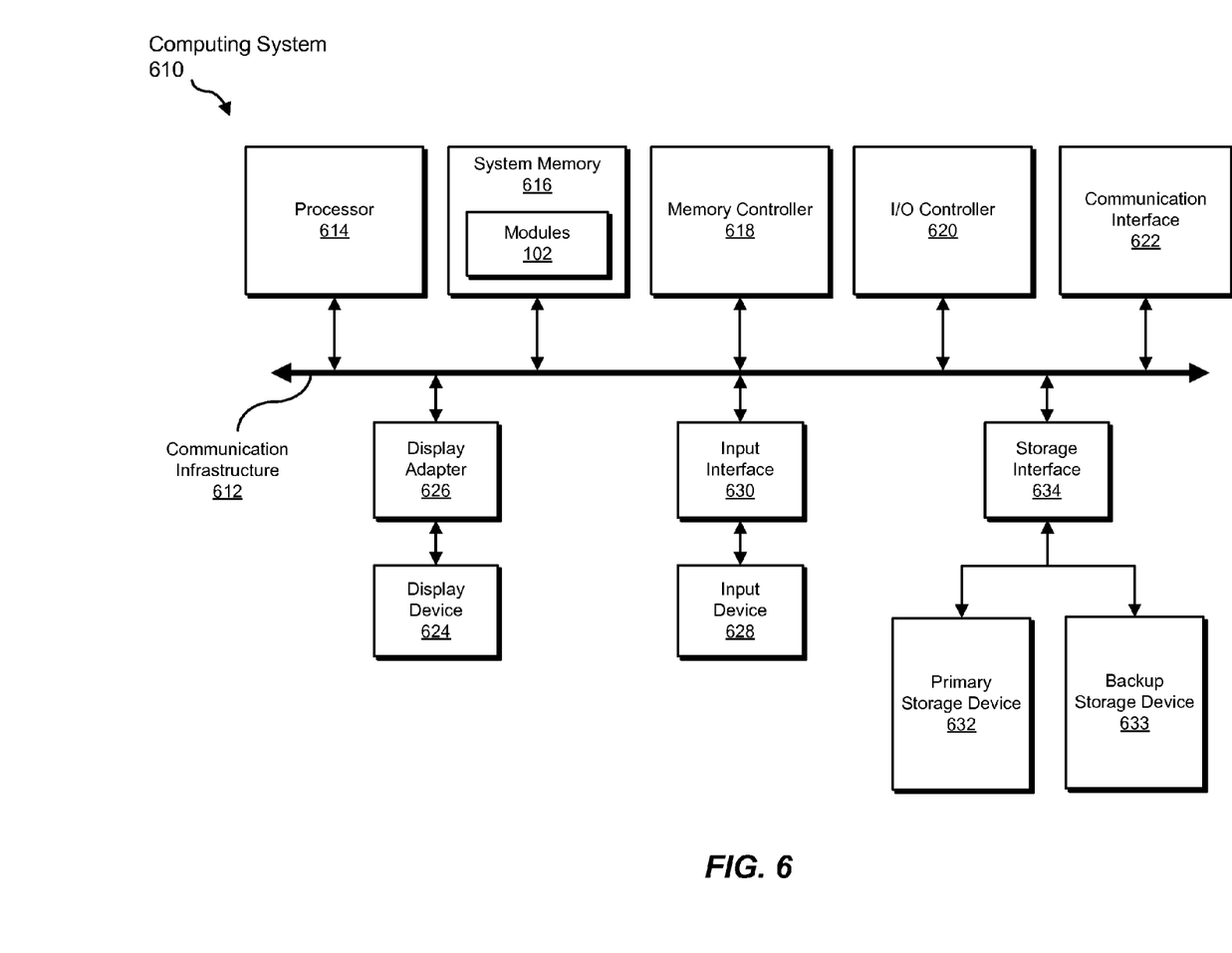
FIG. 6 is a block diagram of an exemplary computing system capable of implementing one or more of the embodiments described and/or illustrated herein.

FIG. 6 is a block diagram of an exemplary computing system 610 capable of implementing one or more of the embodiments described and/or illustrated herein. Computing system 610 broadly represents any single or multi-processor computing device or system capable of executing computer-readable instructions. Examples of computing system 610 include, without limitation, workstations, laptops, client-side terminals, servers, distributed computing systems, handheld devices, or any other computing system or device. In its most basic configuration, computing system 610 may include at least one processor 614 and a system memory 616.

Processor 614 generally represents any type or form of processing unit capable of processing data or interpreting and executing instructions. In certain embodiments, processor 614 may receive instructions from a software application or module. These instructions may cause processor 614 to perform the functions of one or more of the exemplary embodiments described and/or illustrated herein. For example, processor 614 may perform and/or be a means for performing, either alone or in combination with other elements, one or more of the identifying, transmitting, generating, calculating, synchronizing, determining, switching, suspending, extrapolating, and/or replicating steps described herein. Processor 614 may also perform and/or be a means for performing any other steps, methods, or processes described and/or illustrated herein.

System memory 616 generally represents any type or form of volatile or non-volatile storage device or medium capable of storing data and/or other computer-readable instructions.

Examples of system memory 616 include, without limitation, random access memory (RAM), read only memory (ROM), flash memory, or any other suitable memory device. Although not required, in certain embodiments computing system 610 may include both a volatile memory unit (such as, for example, system memory 616) and a non-volatile storage device (such as, for example, primary storage device 632, as described in detail below). In one example, one or more of modules 102 from FIG. 1 may be loaded into system memory 616.

In certain embodiments, exemplary computing system 610 may also include one or more components or elements in addition to processor 614 and system memory 616. For example, as illustrated in FIG. 6, computing system 610 may include a memory controller 618, an input/output (I/O) controller 620, and a communication interface 622, each of which may be interconnected via a communication infrastructure 612. Communication infrastructure 612 generally represents any type or form of infrastructure capable of facilitating communication between one or more components of a computing device. Examples of communication infrastructure 612 include, without limitation, a communication bus (such as an ISA, PCI, PCIe, or similar bus) and a network.

Memory controller 618 generally represents any type or form of device capable of handling memory or data or controlling communication between one or more components of computing system 610. For example, in certain embodiments memory controller 618 may control communication between processor 614, system memory 616, and I/O controller 620 via communication infrastructure 612. In certain embodiments, memory controller 618 may perform and/or be a means for performing, either alone or in combination with other elements, one or more of the steps or features described and/or illustrated herein, such as identifying, transmitting, generating, calculating, synchronizing, determining, switching, suspending, extrapolating, and/or replicating.

I/O controller 620 generally represents any type or form of module capable of coordinating and/or controlling the input and output functions of a computing device. For example, in certain embodiments I/O controller 620 may control or facilitate transfer of data between one or more elements of computing system 610, such as processor 614, system memory 616, communication interface 622, display adapter 626, input interface 630, and storage interface 634. I/O controller 620 may be used, for example, to perform and/or be a means for performing, either alone or in combination with other elements, one or more of the identifying, transmitting, generating, calculating, synchronizing, determining, switching, suspending, extrapolating, and/or replicating steps described herein. I/O controller 620 may also be used to perform and/or be a means for performing other steps and features set forth in the instant disclosure.

Communication interface 622 broadly represents any type or form of communication device or adapter capable of facilitating communication between exemplary computing system 610 and one or more additional devices. For example, in certain embodiments communication interface 622 may facilitate communication between computing system 610 and a private or public network including additional computing systems. Examples of communication interface 622 include, without limitation, a wired network interface (such as a network interface card), a wireless network interface (such as a wireless network interface card), a modem, and any other suitable interface. In at least one embodiment, communication interface 622 may provide a direct connection to a remote server via a direct link to a network, such as the Internet. Communication interface 622 may also indirectly provide such a connection through, for example, a local area network (such as an Ethernet network), a personal area network, a telephone or cable network, a cellular telephone connection, a satellite data connection, or any other suitable connection.

In certain embodiments, communication interface 622 may also represent a host adapter configured to facilitate communication between computing system 610 and one or more additional network or storage devices via an external bus or communications channel. Examples of host adapters include, without limitation, SCSI host adapters, USB host adapters, IEEE 1394 host adapters, SATA and eSATA host adapters, ATA and PATA host adapters, Fibre Channel interface adapters, Ethernet adapters, or the like. Communication interface 622 may also allow computing system 610 to engage in distributed or remote computing. For example, communication interface 622 may receive instructions from a remote device or send instructions to a remote device for execution. In certain embodiments, communication interface 622 may perform and/or be a means for performing, either alone or in combination with other elements, one or more of the identifying, transmitting, generating, calculating, synchronizing, determining, switching, suspending, extrapolating, and/or replicating steps disclosed herein. Communication interface 622 may also be used to perform and/or be a means for performing other steps and features set forth in the instant disclosure.

As illustrated in FIG. 6, computing system 610 may also include at least one display device 624 coupled to communication infrastructure 612 via a display adapter 626. Display device 624 generally represents any type or form of device capable of visually displaying information forwarded by display adapter 626. Similarly, display adapter 626 generally represents any type or form of device configured to forward graphics, text, and other data from communication infrastructure 612 (or from a frame buffer, as known in the art) for display on display device 624.

As illustrated in FIG. 6, exemplary computing system 610 may also include at least one input device 628 coupled to communication infrastructure 612 via an input interface 630. Input device 628 generally represents any type or form of input device capable of providing input, either computer or human generated, to exemplary computing system 610. Examples of input device 628 include, without limitation, a keyboard, a pointing device, a speech recognition device, or any other input device. In at least one embodiment, input device 628 may perform and/or be a means for performing, either alone or in combination with other elements, one or more of the identifying, transmitting, generating, calculating, synchronizing, determining, switching, suspending, extrapolating, and/or replicating steps disclosed herein. Input device 628 may also be used to perform and/or be a means for performing other steps and features set forth in the instant disclosure.

As illustrated in FIG. 6, exemplary computing system 610 may also include a primary storage device 632 and a backup storage device 633 coupled to communication infrastructure 612 via a storage interface 634. Storage devices 632 and 633 generally represent any type or form of storage device or medium capable of storing data and/or other computer-readable instructions. For example, storage devices 632 and 633 may be a magnetic disk drive (e.g., a so-called hard drive), a floppy disk drive, a magnetic tape drive, an optical disk drive, a flash drive, or the like. Storage interface 634 generally represents any type or form of interface or device for transferring data between storage devices 632 and 633 and other components of computing system 610.

In certain embodiments, storage devices 632 and 633 may be configured to read from and/or write to a removable storage unit configured to store computer software, data, or other computer-readable information. Examples of suitable removable storage units include, without limitation, a floppy disk, a magnetic tape, an optical disk, a flash memory device, or the like. Storage devices 632 and 633 may also include other similar structures or devices for allowing computer software, data, or other computer-readable instructions to be loaded into computing system 610. For example, storage devices 632 and 633 may be configured to read and write software, data, or other computer-readable information. Storage devices 632 and 633 may also be a part of computing system 610 or may be a separate device accessed through other interface systems.

In certain embodiments, storage devices 632 and 633 may be used, for example, to perform and/or be a means for performing, either alone or in combination with other elements, one or more of the identifying, transmitting, generating, calculating, synchronizing, determining, switching, suspending, extrapolating, and/or replicating steps disclosed herein. Storage devices 632 and 633 may also be used to perform and/or be a means for performing other steps and features set forth in the instant disclosure.

Many other devices or subsystems may be connected to computing system 610. Conversely, all of the components and devices illustrated in FIG. 6 need not be present to practice the embodiments described and/or illustrated herein. The devices and subsystems referenced above may also be interconnected in different ways from that shown in FIG. 6. Computing system 610 may also employ any number of software, firmware, and/or hardware configurations. For example, one or more of the exemplary embodiments disclosed herein may be encoded as a computer program (also referred to as computer software, software applications, computer-readable instructions, or computer control logic) on a computer-readable medium. The phrase "computer-readable medium" generally refers to any form of device, carrier, or medium capable of storing or carrying computer-readable instructions. Examples of computer-readable media include, without limitation, transmission-type media, such as carrier waves, and physical media, such as magnetic-storage media (e.g., hard disk drives and floppy disks), optical-storage media (e.g., CD- or DVD-ROMs), electronic-storage media (e.g., solid-state drives and flash media), and other distribution systems.

The computer-readable medium containing the computer program may be loaded into computing system 610. All or a portion of the computer program stored on the computer-readable medium may then be stored in system memory 616 and/or various portions of storage devices 632 and 633. When executed by processor 614, a computer program loaded into computing system 610 may cause processor 614 to perform and/or be a means for performing the functions of one or more of the exemplary embodiments described and/or illustrated herein. Additionally or alternatively, one or more of the exemplary embodiments described and/or illustrated herein may be implemented in firmware and/or hardware. For example, computing system 610 may be configured as an application specific integrated circuit (ASIC) adapted to implement one or more of the exemplary embodiments disclosed herein.

Figure 7:
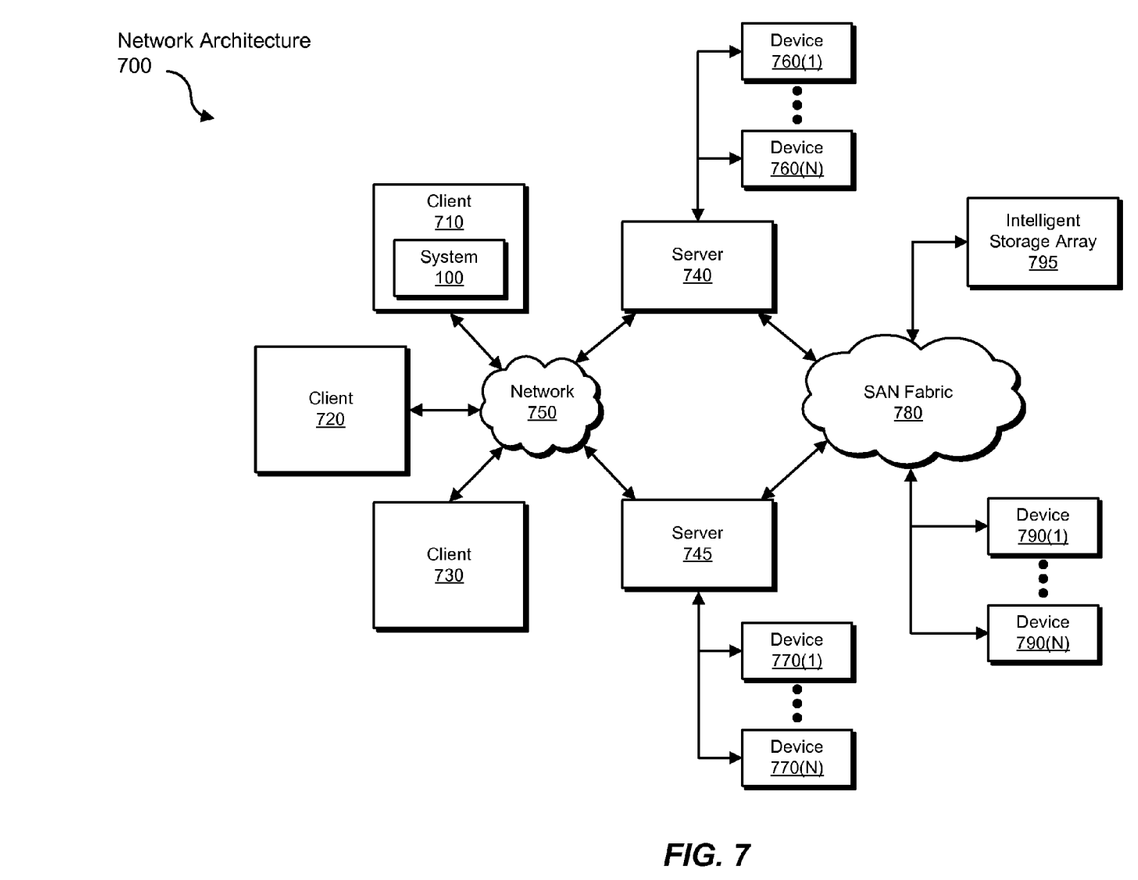
FIG. 7 is a block diagram of an exemplary computing network capable of implementing one or more of the embodiments described and/or illustrated herein.

FIG. 7 is a block diagram of an exemplary network architecture 700 in which client systems 710, 720, and 730 and servers 740 and 745 may be coupled to a network 750. Client systems 710, 720, and 730 generally represent any type or form of computing device or system, such as exemplary computing system 610 in FIG. 6. In one example, client system 710 may include system 100 from FIG. 1.

Similarly, servers 740 and 745 generally represent computing devices or systems, such as application servers or database servers, configured to provide various database services and/or run certain software applications. Network 750 generally represents any telecommunication or computer network including, for example, an intranet, a wide area network (WAN), a local area network (LAN), a personal area network (PAN), or the Internet.

As illustrated in FIG. 7, one or more storage devices 760(1)-(N) may be directly attached to server 740. Similarly, one or more storage devices 770(1)-(N) may be directly attached to server 745. Storage devices 760(1)-(N) and storage devices 770(1)-(N) generally represent any type or form of storage device or medium capable of storing data and/or other computer-readable instructions. In certain embodiments, storage devices 760(1)-(N) and storage devices 770(1)-(N) may represent network-attached storage (NAS) devices configured to communicate with servers 740 and 745 using various protocols, such as NFS, SMB, or CIFS.

Servers 740 and 745 may also be connected to a storage area network (SAN) fabric 780. SAN fabric 780 generally represents any type or form of computer network or architecture capable of facilitating communication between a plurality of storage devices. SAN fabric 780 may facilitate communication between servers 740 and 745 and a plurality of storage devices 790(1)-(N) and/or an intelligent storage array 795. SAN fabric 780 may also facilitate, via network 750 and servers 740 and 745, communication between client systems 710, 720, and 730 and storage devices 790(1)-(N) and/or intelligent storage array 795 in such a manner that devices 790(1)-(N) and array 795 appear as locally attached devices to client systems 710, 720, and 730. As with storage devices 760(1)-(N) and storage devices 770(1)-(N), storage devices 790(1)-(N) and intelligent storage array 795 generally represent any type or form of storage device or medium capable of storing data and/or other computer-readable instructions.

In certain embodiments, and with reference to exemplary computing system 610 of FIG. 6, a communication interface, such as communication interface 622 in FIG. 6, may be used to provide connectivity between each client system 710, 720, and 730 and network 750. Client systems 710, 720, and 730 may be able to access information on server 740 or 745 using, for example, a web browser or other client software. Such software may allow client systems 710, 720, and 730 to access data hosted by server 740, server 745, storage devices 760(1)-(N), storage devices 770(1)-(N), storage devices 790(1)-(N), or intelligent storage array 795. Although FIG. 7 depicts the use of a network (such as the Internet) for exchanging data, the embodiments described and/or illustrated herein are not limited to the Internet or any particular network-based environment.

In at least one embodiment, all or a portion of one or more of the exemplary embodiments disclosed herein may be encoded as a computer program and loaded onto and executed by server 740, server 745, storage devices 760(1)-(N), storage devices 770(1)-(N), storage devices 790(1)-(N), intelligent storage array 795, or any combination thereof. All or a portion of one or more of the exemplary embodiments disclosed herein may also be encoded as a computer program, stored in server 740, run by server 745, and distributed to client systems 710, 720, and 730 over network 750. Accordingly, network architecture 700 may perform and/or be a means for performing, either alone or in combination with other elements, one or more of the identifying, transmitting, generating, calculating, synchronizing, determining, switching, suspending, extrapolating, and/or replicating steps disclosed herein. Network architecture 700 may also be used to perform and/or be a means for performing other steps and features set forth in the instant disclosure.

As detailed above, computing system 610 and/or one or more components of network architecture 700 may perform and/or be a means for performing, either alone or in combination with other elements, one or more steps of an exemplary method for replicating data in cluster environments.

While the foregoing disclosure sets forth various embodiments using specific block diagrams, flowcharts, and examples, each block diagram component, flowchart step, operation, and/or component described and/or illustrated herein may be implemented, individually and/or collectively, using a wide range of hardware, software, or firmware (or any combination thereof) configurations. In addition, any disclosure of components contained within other components should be considered exemplary in nature since many other architectures can be implemented to achieve the same functionality.

In some examples, all or a portion of exemplary system 100 in FIG. 1 may represent portions of a cloud-computing or network-based environment. Cloud-computing environments may provide various services and applications via the Internet. These cloud-based services (e.g., software as a service, platform as a service, infrastructure as a service, etc.) may be accessible through a web browser or other remote interface. Various functions described herein may be provided through a remote desktop environment or any other cloud-based computing environment.

The process parameters and sequence of steps described and/or illustrated herein are given by way of example only and can be varied as desired. For example, while the steps illustrated and/or described herein may be shown or discussed in a particular order, these steps do not necessarily need to be performed in the order illustrated or discussed. The various exemplary methods described and/or illustrated herein may also omit one or more of the steps described or illustrated herein or include additional steps in addition to those disclosed.

While various embodiments have been described and/or illustrated herein in the context of fully functional computing systems, one or more of these exemplary embodiments may be distributed as a program product in a variety of forms, regardless of the particular type of computer-readable media used to actually carry out the distribution. The embodiments disclosed herein may also be implemented using software modules that perform certain tasks. These software modules may include script, batch, or other executable files that may be stored on a computer-readable storage medium or in a computing system. In some embodiments, these software modules may configure a computing system to perform one or more of the exemplary embodiments disclosed herein.

In addition, one or more of the modules described herein may transform data, physical devices, and/or representations of physical devices from one form to another. For example, one or more of the modules described herein may transform a cluster of nodes into a system for efficiently replicating data in clustered environments.

The preceding description has been provided to enable others skilled in the art to best utilize various aspects of the exemplary embodiments disclosed herein. This exemplary description is not intended to be exhaustive or to be limited to any precise form disclosed. Many modifications and variations are possible without departing from the spirit and scope of the instant disclosure. The embodiments disclosed herein should be considered in all respects illustrative and not restrictive. Reference should be made to the appended claims and their equivalents in determining the scope of the instant disclosure.

Unless otherwise noted, the terms "a" or "an," as used in the specification and claims, are to be construed as meaning "at least one of." In addition, for ease of use, the words "including" and "having," as used in the specification and claims, are interchangeable with and have the same meaning as the word "comprising."

What is claimed is:

1. A computer-implemented method for replicating data in cluster environments, at least a portion of the method being performed by a computing device comprising at least one processor, the method comprising:
    identifying a cluster of nodes configured to replicate a common storage of the cluster;
    identifying a first write operation issued by a first node in the cluster of nodes to the common storage;
    identifying a second write operation issued by a second node in the cluster of nodes to the common storage, the second write operation issued after the first write operation;
    identifying a completion time of the first write operation as recorded by a first system clock of the first node;
    identifying a start time of the second write operation as recorded by a second system clock of the second node;
    identifying a maximum potential skew between the first system clock and the second system clock;
    determining that the first write operation and the second write operation are mutually independent by determining that the start time of the second write operation precedes the completion time of the first write operation by a span greater than the maximum potential skew;
    replicating the first write operation and the second write operation in parallel based on the determination that the first write operation and the second write operation are mutually independent.

2. The computer-implemented method of claim 1, further comprising synchronizing the first system clock and the second system clock.

3. The computer-implemented method of claim 1, wherein the cluster of nodes is configured to replicate the common storage by providing continuous data protection for the common storage.

4. The computer-implemented method of claim 1, further comprising:
    identifying a third write operation issued by a third node in the cluster of nodes to the common storage;
    identifying a fourth write operation issued by a fourth node in the cluster of nodes to the common storage, the fourth write operation issued after the third write operation;
    identifying a completion time of the third write operation as recorded by a third system clock of the third node;
    identifying a start time of the fourth write operation as recorded by a fourth system clock of the fourth node;
    identifying an additional maximum potential skew between the third system clock and the fourth system clock;
    determining that the fourth write operation is dependent on the third write operation based in part by determining that the start time of the fourth write operation does not precede the completion time of the third write operation by a span greater than the additional maximum potential skew;

replicating the third write operation and the fourth write operation serially based on the determination that the fourth write operation depends on the third write operation.

5. The computer-implemented method of claim 1, wherein identifying the maximum potential skew comprises:
   transmitting a first message from the first node to the second node, the first message including a first timestamp based on the time as identified by the first system clock that the first node transmitted the first message;
   generating a second timestamp based on the time as identified by the second system clock that the second node received the first message;
   transmitting a second message from the second node to the first node, the second message including a third timestamp based on the time as identified by the second system clock that the second node transmitted the second message;
   generating a fourth timestamp based on the time as identified by the first system clock that the first node received the second message;
   calculating the maximum potential skew based on the first timestamp, the second timestamp, the third timestamp, and the fourth timestamp.

6. The computer-implemented method of claim 1, further comprising determining that the maximum potential skew exceeds a predetermined threshold.

7. The computer-implemented method of claim 6, further comprising switching to an alternate dependency protocol until the first system clock and the second system clock are resynchronized.

8. The computer-implemented method of claim 6, further comprising suspending write operations from the first node and the second node until the first system clock and the second system clock are resynchronized.

9. The computer-implemented method of claim 6, wherein determining that the maximum potential skew exceeds a predetermined threshold comprises extrapolating the maximum potential skew based on an estimated rate of change of a skew between the first system clock and the second system clock.

10. The computer-implemented method of claim 1, further comprising:
    identifying an additional node configured to join the cluster of nodes;
    synchronizing a system clock of the additional node with the cluster before allowing the additional node to join the cluster.

11. A system for replicating data in cluster environments, the system comprising:
    an identification module programmed to:
       identify a cluster of nodes configured to replicate a common storage of the cluster;
       identify a first write operation issued by a first node in the cluster of nodes to the common storage;
       identify a second write operation issued by a second node in the cluster of nodes to the common storage, the second write operation issued after the first write operation;
       identify a completion time of the first write operation as recorded by a first system clock of the first node;
       identify a start time of the second write operation as recorded by a second system clock of the second node;
    a skew module programmed to identify a maximum potential skew between the first system clock and the second system clock;
    a determination module programmed to determine that the first write operation and the second write operation are mutually independent by determining that the start time of the second write operation precedes the completion time of the first write operation by a span greater than the maximum potential skew;
    a replication module programmed to replicate the first write operation and the second write operation in parallel based on the determination that the first write operation and the second write operation are mutually independent;
    at least one processor configured to execute the identification module, the skew module, the determination module, and the replication module.

12. The system of claim 11, wherein the skew module is further programmed to synchronize the first system clock and the second system clock.

13. The system of claim 11, wherein the cluster of nodes is configured to replicate the common storage by providing continuous data protection for the common storage.

14. The system of claim 11, wherein:
    the identification module is further programmed to:
       identify a third write operation issued by a third node in the cluster of nodes to the common storage;
       identify a fourth write operation issued by a fourth node in the cluster of nodes to the common storage, the fourth write operation issued after the third write operation;
       identify a completion time of the third write operation as recorded by a third system clock of the third node;
       identify a start time of the fourth write operation as recorded by a fourth system clock of the fourth node;
    the skew module is further programmed to identify an additional maximum potential skew between the third system clock and the fourth system clock;
    the determination module is further programmed to determine that the fourth write operation is dependent on the third write operation based in part by determining that the start time of the fourth write operation does not precede the completion time of the third write operation by a span greater than the additional maximum potential skew;
    the replication module is further programmed to replicate the third write operation and the fourth write operation serially based on the determination that the fourth write operation depends on the third write operation.

15. The system of claim 11, wherein the skew module is programmed to identify the maximum potential skew by:
    transmitting a first message from the first node to the second node, the first message including a first timestamp based on the time as identified by the first system clock that the first node transmitted the first message;
    generating a second timestamp based on the time as identified by the second system clock that the second node received the first message;
    transmitting a second message from the second node to the first node, the second message including a third timestamp based on the time as identified by the second system clock that the second node transmitted the second message;
    generating a fourth timestamp based on the time as identified by the first system clock that the first node received the second message;
    calculating the maximum potential skew based on the first timestamp, the second timestamp, the third timestamp, and the fourth timestamp.

16. The system of claim 11, wherein the skew module is further programmed to determine that the maximum potential skew exceeds a predetermined threshold.

17. The system of claim 16, wherein the skew module is further programmed to switch to an alternate dependency protocol until the first system clock and the second system clock are resynchronized.

18. The system of claim 16, wherein the skew module is further programmed to suspend write operations from the first node and the second node until the first system clock and the second system clock are resynchronized.

19. The system of claim 16, wherein the skew module is programmed to determine that the maximum potential skew exceeds a predetermined threshold by extrapolating the maximum potential skew based on an estimated rate of change of a skew between the first system clock and the second system clock.

20. A non-transitory computer-readable-storage medium comprising one or more computer-executable instructions that, when executed by at least one processor of a computing device, cause the computing device to:

identify a cluster of nodes configured to replicate a common storage of the cluster;

identify a first write operation issued by a first node in the cluster of nodes to the common storage;

identify a second write operation issued by a second node in the cluster of nodes to the common storage, the second write operation issued after the first write operation;

identify a completion time of the first write operation as recorded by a first system clock of the first node;

identify a start time of the second write operation as recorded by a second system clock of the second node;

identify a maximum potential skew between the first system clock and the second system clock;

determine that the first write operation and the second write operation are mutually independent by determining that the start time of the second write operation precedes the completion time of the first write operation by a span greater than the maximum potential skew;

replicate the first write operation and the second write operation in parallel based on the determination that the first write operation and the second write operation are mutually independent.

* * * * *